US009664363B2

(12) United States Patent

Tsai

(10) Patent No.: US 9,664,363 B2
(45) Date of Patent: May 30, 2017

(54) STEREOSCOPIC INTEGRATED LED LIGHT SOURCE MODULE AND METHOD FOR MAKING THE SAME AND LED LAMP

(71) Applicant: Kaistar Lighting (Xiamen) Co., ltd, Xiamen (CN)

(72) Inventor: ChingHsien Tsai, Xiamen (CN)

(73) Assignee: Kaistar Lighting (Xiamen) Co., ltd., Xiamen (CN)

( * ) Notice: Subject to any disclaimer, the term of this patent is extended or adjusted under 35 U.S.C. 154(b) by 52 days.

(21) Appl. No.: 14/882,426

(22) Filed: Oct. 13, 2015

(65) Prior Publication Data

US 2016/0195223 A1 Jul. 7, 2016

(51) Int. Cl.

| | |
|---|---|
| ***H05B 33/08*** | (2006.01) |
| ***F21V 23/00*** | (2015.01) |
| ***F21V 23/02*** | (2006.01) |
| ***G02B 27/22*** | (2006.01) |
| ***F21K 9/90*** | (2016.01) |
| ***F21K 9/232*** | (2016.01) |
| *F21V 23/06* | (2006.01) |
| *F21Y 101/00* | (2016.01) |
| *F21Y 115/10* | (2016.01) |
| *F21Y 107/40* | (2016.01) |

(52) U.S. Cl.

CPC ............ *F21V 23/005* (2013.01); *F21K 9/232* (2016.08); *F21K 9/90* (2013.01); *F21V 23/06* (2013.01); *F21Y 2101/00* (2013.01); *F21Y 2107/40* (2016.08); *F21Y 2115/10* (2016.08)

(58) Field of Classification Search

None

See application file for complete search history.

(56) References Cited

U.S. PATENT DOCUMENTS

2013/0010462 A1* 1/2013 Kobayashi ......... G02B 27/2285 362/231

2014/0340870 A1* 11/2014 Premysler ............ F21V 29/402 362/84

* cited by examiner

*Primary Examiner* — Dedei K Hammond

(74) *Attorney, Agent, or Firm* — Hemisphere Law, PLLC

(57) ABSTRACT

The present disclosure discloses a stereoscopic integrated LED light source module, which comprises a columnar insulated support, a plurality of conducting circuits located on outer surface of the columnar insulated support, a plurality of LED light sources connected the conducting circuits to form a plurality of illumination areas, and a plurality of LED drive elements connected the conducting circuits to form a plurality of drive areas. A plurality of cabling channels are located on outer surface of the columnar insulated support, and the conducting circuits are formed on the cabling channels. This disclosure also discloses a LED lamp which uses the LED light source module stated above and a method for manufacturing the same. The present disclosure increases production efficiency and light emitting angle, and reduces manufacturing cost.

10 Claims, 5 Drawing Sheets

STEREOSCOPIC INTEGRATED LED LIGHT SOURCE MODULE AND METHOD FOR MAKING THE SAME AND LED LAMP

TECHNICAL FIELD OF THE INVENTION

This disclosure refers to the technical field of manufacture of LED lamp, in particular to a stereoscopic integrated LED light source module and the method for making the same and an LED lamp using the same.

BACKGROUND OF THE INVENTION

Traditional LED lamp includes an LED light source, a substrate, a power driver, an optical element, heat dissipation and structural elements. LED light source element usually consists of LED light sources and the substrate. The LED light sources are located on a same plane and include only one luminous zone, which causes a small lighting angle that less than 180°. Further, because there are so much materials and components, more tools, work stations and production time are needed during the manufacturing process. Material preparation also consumes much time. The production efficiency cannot be improved.

SUMMARY OF THE INVENTION

One Objective of the present disclosure is to provide a stereoscopic integrated LED light source module, which can increase the production efficiency of LED lamps and the light emitting angle of the LED light and reduce the manufacturing cost.

To achieve the objective stated above, the present disclosure provides a stereoscopic integrated LED light source module, which comprises a columnar insulated support, a plurality of conducting circuits located on the outer surface of the columnar insulated support a plurality of LED light sources connected with a part of the plurality of conducting circuits to form a plurality of illumination areas, a plurality of LED drive elements connected with the other part of the plurality of conducting circuits to form a plurality of drive areas.

Preferably, the columnar insulated support is made of plastic material containing metal particles therein. Thus, parts of metal particles can be easily exposed by laser to firmly form conducting circuits thereon.

Further, the columnar insulated support is a hollow structure. Preferably, a body of the columnar insulated support is selected from a group consisting of triangular prism, a quadrangular prism or a hexagonal prism.

Further, the density of the conducting circuits in the driver areas is greater than the density of conducting circuits in the illumination areas.

Further, two pins are located on the columnar insulated support for connecting with external power. One end of each the two pins is electrically connected with the plurality of conducting circuits. The two pins further improve the assembly efficiency.

Further, a plurality of locking connection protuberances are located on the columnar insulated support, in order to fixed to lamp shell conveniently.

Preferably, driver areas and illumination areas are located on parts of side faces of the columnar insulated support to compact the structure.

Further, a plurality of cabling channels are located on the outer surface of the columnar insulated support. The conducting circuits are formed on the cabling channels which make the conducting circuits firmly and conveniently attach on the outer surface of the columnar insulated support.

Another objective of the present disclosure is to provide a method for manufacturing a stereoscopic integrated LED light source module. The method comprises the following steps:

- forming a columnar insulted support with plastic base material containing metal particles therein by injection molding;
- exciting the surface of the columnar insulted support with laser along a pre-designed route of conducting circuit to form the cabling channels and activating the metal ions in the cabling channels;
- coating gold, silver, copper or nickel on the cabling channels to form the conducting circuit
- mounting a plurality of LED light sources and a plurality of LED drive elements on the conducting circuit.

Preferably, copper is coated on the cabling channels, the LED light sources and the LED drive elements are assembled by surface mounting technology.

Another objective of the present disclosure is to provide an LED lamp comprising the above stereoscopic integrated LED light source module installed therein.

The LED lamp comprises a lamp cap, a lamp shell and a lampshade. The lamp cap is fixed on one end of the lamp shell, the lampshade is fixed on the other end of the lamp shell. The LED light source module stated above is installed in the lamp shell. The LED light source module is connected with two electrodes of the lamp cap.

In the present invention, a plurality of conducting circuits are located on the outer surface of the columnar insulated support; and a plurality of LED light sources are connected with a part of conducting circuits to form a plurality of illumination areas. A plurality of LED chive elements are connected with the other part of the conducting circuits to form a plurality of driver areas. The plurality of illumination areas improve the light emitting angle. The illumination areas and the driver areas are installed on a same columnar insulated support, which reduces jigs, work stations, and preparation time in production process. This disclosure also improves production efficiency and decreases manufacture cost. Furthemore, this disclosure improves the compactness of the structure.

DETAIL DESCRIPTION OF THE INVENTION

The detail description of the disclosure with drawings and embodiments will be described below.

Figure 1:
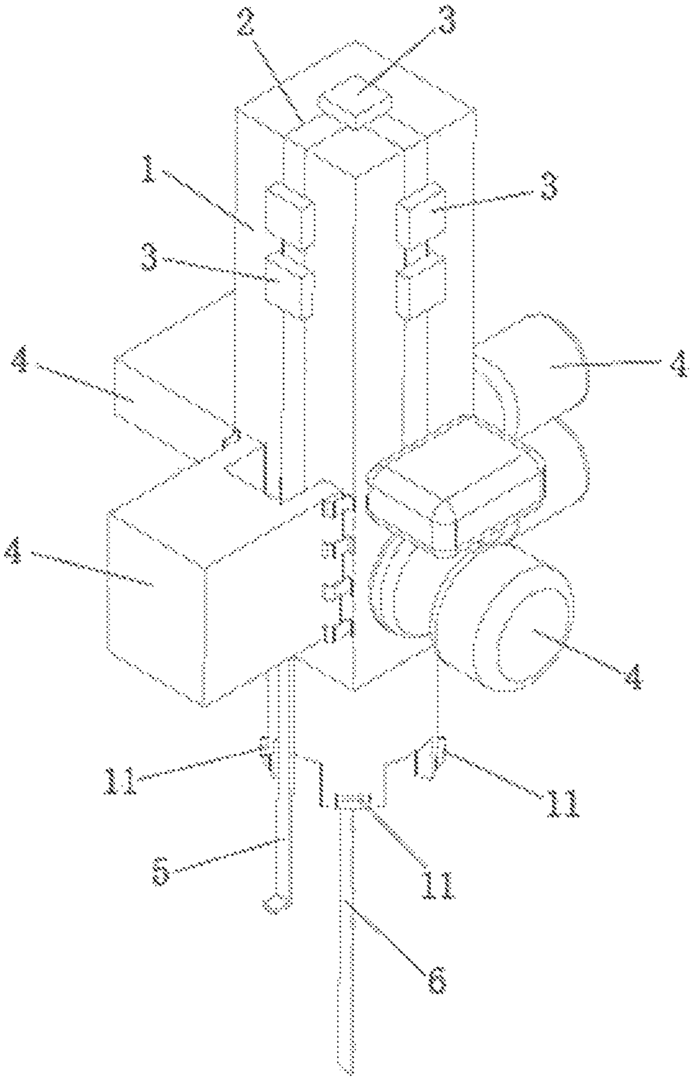
FIG. 1 is a stereoscopic view of a first embodiment of the disclosure.
Figure 2:
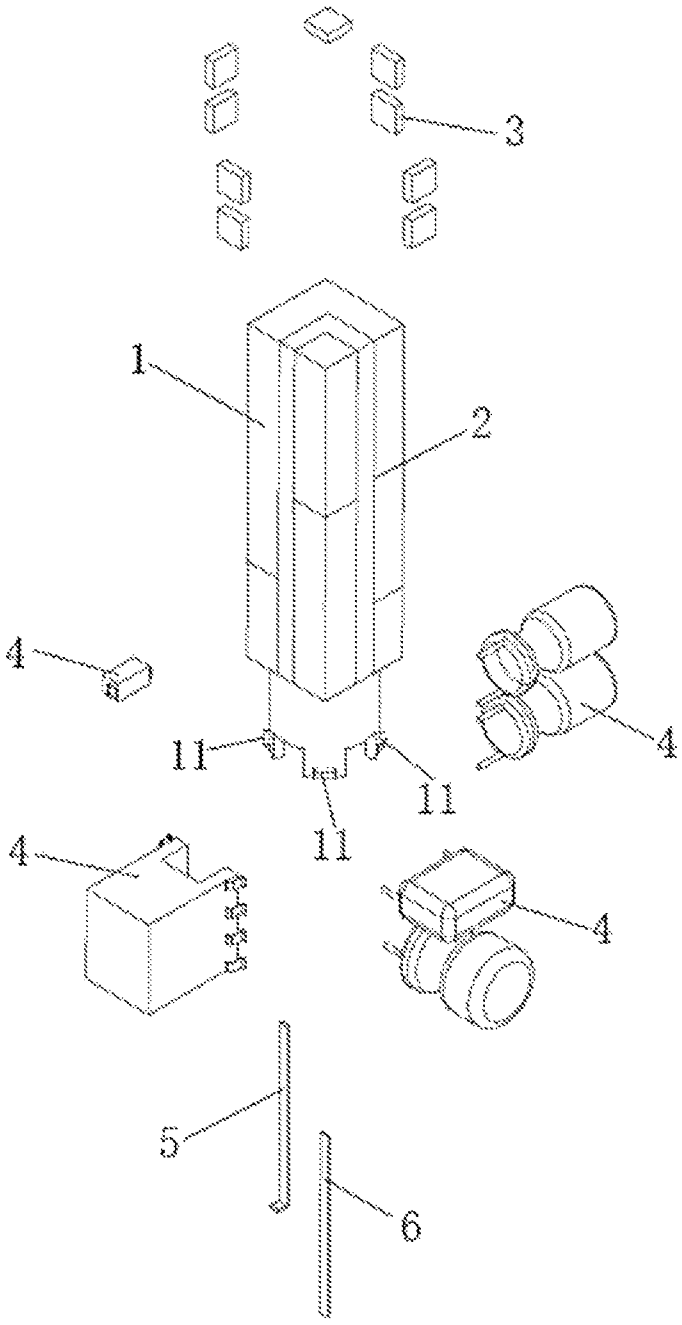
FIG. 2 is a stereoscopic exploded view of the first embodiment of the disclosure.

In the first embodiment, as shown in FIGS. 1 and 2, a stereoscopic integrated LED light source module, comprises columnar insulated support 1, a plurality of conducting circuits 2 located on the outer surface of columnar insulated support 1, a plurality of LED light sources 3 located on faces of the upper end of columnar insulated support 1 and electrically connected to conducting circuits 2 to form a plurality of illumination areas, and a plurality of LED chive elements 4 located on the lower end of columnar insulated support 1 and electrically connected to conducting circuits 2 to form a plurality of driver areas.

Conducting circuit 2 can be formed into a plurality of layouts according to difference requirements. A density of conducting circuit in driver areas is greater than a density of conducting circuit in illumination areas. In this embodiment, the density of the conducting circuit means the ratio of the surface area of the conducting circuit to the surface area of the illumination areas. Integration effect can be improved by the configuration with different densities of conducting circuit in driver areas and illumination areas.

Columnar insulated support 1 is made of plastic with metal particles therein. The plastic containing metallic oxide or metal chelate can be selected. In one embodiment, the plastic containing $Al_2O_3$ is used. The plastic can be Nylon, polybutylece terephthalate (PBT), poly carbonate (PC) or polyimide (PI). This material can generate metal ion activation areas on the surface under a specific excitation energy. Metal ions can combine with metal of the conducting circuit, which improves stability of the conducting circuit. Generally speaking, the excitation energy is provided by laser.

A plurality of cabling channels are located on the outer surface of columnar insulated support 1. The cabling channels are formed by laser. Conducting circuit 2 is formed on the cabling channels. Preferably the thickness of conducting circuit 2 is greater than the height of the cabling channels, which makes it convenient for mounting components.

Columnar insulated support 1 is a hollow structure.

The body of columnar insulated support 1 is a quadrangular prism.

A plurality of locking connection parts 11 is located on one end of columnar insulated support 1 in order to fix to lamp shell conveniently.

Two pins 5, 6 are located on columnar insulated support 1 for connecting with external power. One end of each two pins 5, 6 are electrically connected with conducting circuits 2.

Regarding to FIG. 1, driver areas and illumination areas are located on parts of side faces of columnar insulated support 1. LED light sources 3 and LED drive elements 4 located on a same side face can be mounted conveniently and improve the compactness of the structure.

Figure 3:
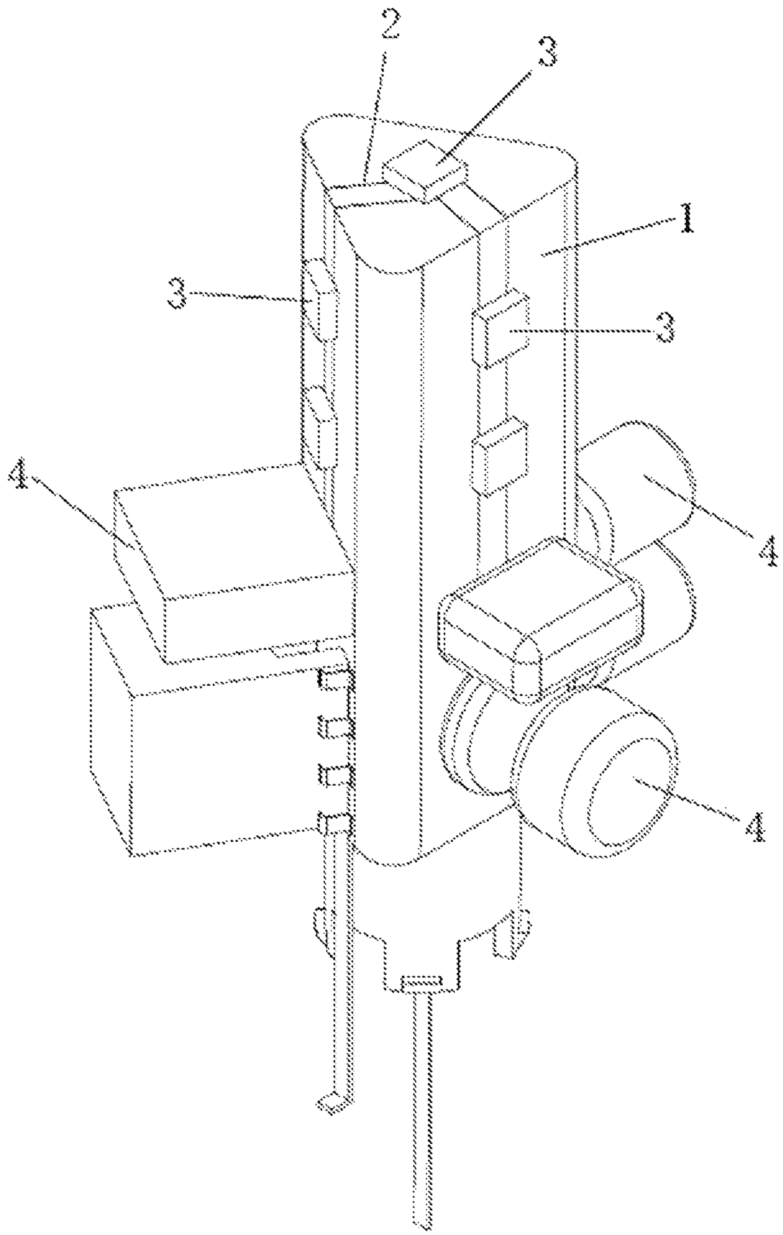
FIG. 3 is a stereoscopic view of a second embodiment of the disclosure.

In the second embodiment, as shown in FIG. 3, a stereoscopic integrated LED light source module, the difference between the first embodiment and the second embodiment is that the body of columnar insulated support 1 is a triangular prism. The layout of conducting circuits 2, LED light sources 3 and LED drive elements 4 are different from that of the first embodiment according to the change of the body of the columnar insulated support 1.

Figure 4:
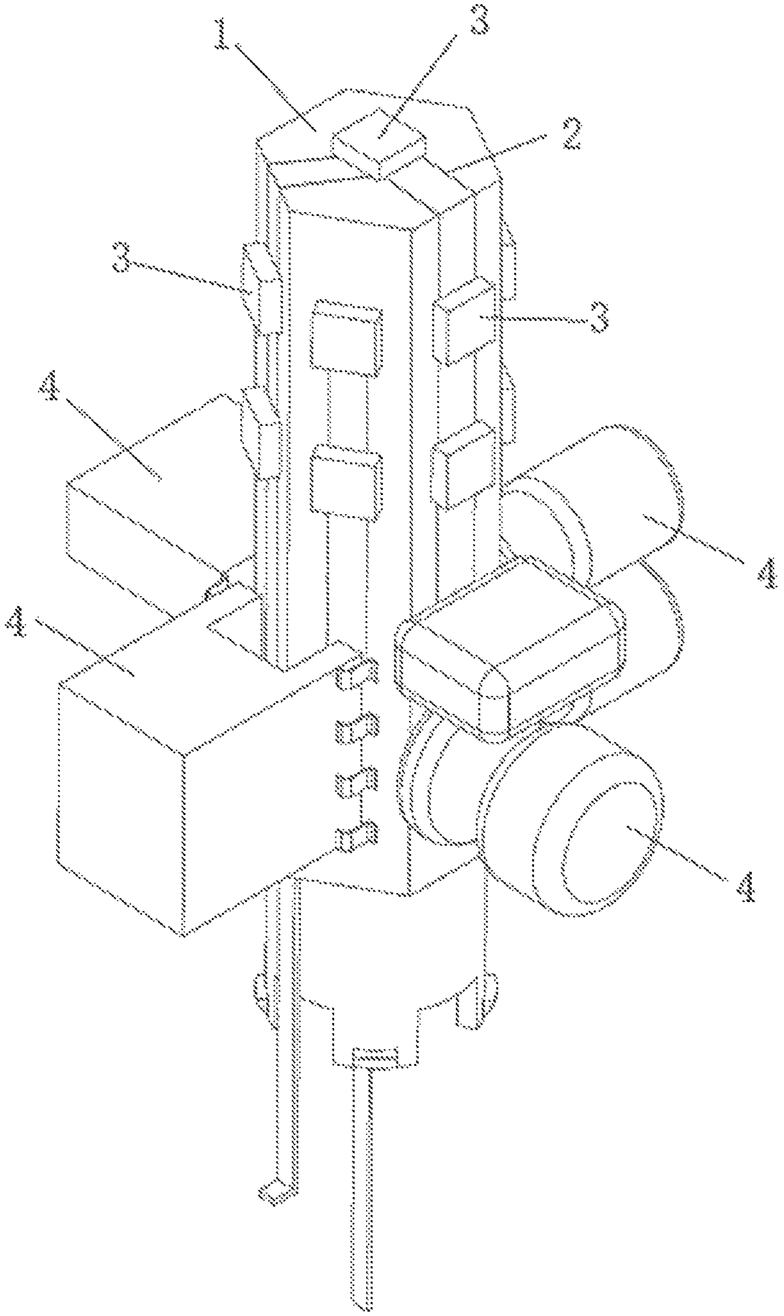
FIG. 4 is a stereoscopic view of a third embodiment of the disclosure.

In the third embodiment, as shown in FIG. 4, a stereoscopic integrated LED light source module, the difference between the first embodiment and the third embodiment is that the body of columnar insulated support 1 is a hexagonal prism. The layout of conducting circuits 2, LED light sources 3 and LED drive elements 4 are different from that of the first embodiment according to the change of the body of the columnar insulated support 1.

Figure 5:
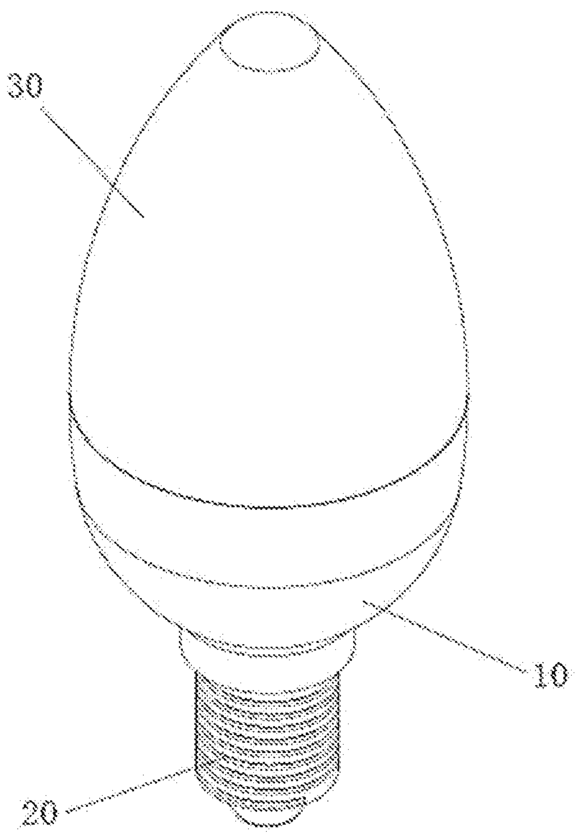
FIG. 5 is a stereoscopic view of a LED lamp in the disclosure.

As shown in FIG. 5, an LED lamp, comprises lamp shell 10 which dissipates heat, lamp cap 20, and lampshade 30. Lamp cap 20 is fixed on one end of lamp shell 10, lampshade 30 is fixed on the other end of lamp shell 10. An LED light source module in any one of embodiments stated above is installed in lamp shell 10. Two pins 5, 6 are electrically connected with two electrodes of lamp cap 20.

A method for manufacturing a stereoscopic integrated LED light source module, comprises the following steps:

- forming a columnar insulted support 1 with plastic base material containing metal particles therein by injection molding, specifically, the plastic base material is plastic containing $Al_2O_3$, the plastic can be Nylon, polybutylece terephthalate (PBT), poly carbonate (PC) or polyimide (PI);
- exciting the surface of columnar insulted support 1 with laser along a pre-designed route of conducting circuit to form the cabling channels, activating the metal ions in the cabling channels; and
- coating gold, silver, copper or nickel on the cabling channels to form conducting circuit 2;
- mounting a plurality of LED light sources 3 and a plurality of LED drive elements 4 on conducting circuit 2.

Conducting circuit 2 can be set in various arrangements as required. The density of conducting circuit in driver areas is greater than the density of conducting circuit in illumination areas. In the embodiments of this invention, the density of the conducting circuit means the ratio of the surface area of the conducting circuit to the surface area of the areas stated above. The configuration with different densities of conducting circuit in driver areas and illumination areas improves integration effect.

The above description is preferred embodiments of the present invention. Equal modification according to the claims are also in the scope of this application.

The invention claimed is:

1. A stereoscopic integrated LED light source module, comprising:

- a columnar insulated support:
- a plurality of conducting circuits located on the outer surface of the columnar insulated support:
- a plurality of LED light sources connected with a part of the plurality of conducting circuits to form a plurality of illumination areas; and
- a plurality of LED drive elements connected with the other part of the plurality of conducting circuits to form a plurality of driver areas.

2. The LED light source module of claim 1, wherein the columnar insulated support is made of plastic material containing metal particles therein.

3. The LED light source module of claim 1, wherein the columnar insulated support is a hollow structure, a body of the columnar insulated support is selected from a group consisting of triangular prism, quadrangular prism and hexagonal prism.

4. The LED light source module of claim 1, wherein a density of the conducting circuits in the driver areas is greater than a density of conducting circuits in the illumination areas.

5. The LED light source module of claim 1, further comprising two pins located on the columnar insulated support for connecting with external power, wherein one end of each the two pins is electrically connected with the plurality of conducting circuits.

6. The LED light source module of claim 1, further comprising a plurality of locking connection protuberances located on the columnar insulated support.

7. The LED light source module of claim 1, wherein driver areas and illumination areas are located on parts of side faces of the columnar insulated support.

8. The LED light source module of claim 1, wherein a plurality of cabling channels are located on the outer surface of the columnar insulated support, and the conducting circuits are formed on the cabling channels.

9. An LED lamp, comprising:

a lamp cap, a lamp shell, a lampshade; and wherein the lamp cap is fixed on an end of the lamp shell, the lampshade is fixed on the other end of the lamp shell;

wherein an LED light source module of claim 1 is installed in the lamp shell, the LED. light source module is connected with two electrodes of the lamp cap.

10. A method for making an LED light source module, comprising the steps of:

forming a columnar insulted support with plastic base material containing metal particles therein by injection molding;

exciting the surface of the columnar insulted support with laser along a pre-designed route of a conducting circuit to form the cabling channels and activating the metal ions in the cabling channels;

coating gold, silver, copper or nickel on the cabling channels to form the conducting circuit;

mounting a plurality of LED light sources and a plurality of LED drive elements on the conducting circuit.

* * * * *